United States Patent
Tanaka (10) Patent No.: US 10,933,758 B2
(45) Date of Patent: Mar. 2, 2021

(54) POWER TRANSFER DEVICE

(71) Applicant: DAIHEN Corporation, Osaka (JP)

(72) Inventor: Ryouhei Tanaka, Osaka (JP)

(*) Notice: Subject to any disclaimer, the term of this patent is extended or adjusted under 35 U.S.C. 154(b) by 0 days.

(21) Appl. No.: 16/510,095

(22) Filed: Jul. 12, 2019

(65) Prior Publication Data

US 2020/0031243 A1 Jan. 30, 2020

(30) Foreign Application Priority Data

Jul. 24, 2018 (JP) .............................. JP2018-138867

(51) Int. Cl.
 *B60L 53/124* (2019.01)
 *H02J 50/60* (2016.01)
 *H02J 50/10* (2016.01)

(52) U.S. Cl.
 CPC ............ *B60L 53/124* (2019.02); *H02J 50/10* (2016.02); *H02J 50/60* (2016.02)

(58) Field of Classification Search
 CPC .......... B60L 53/124; B60L 53/00; B60L 1/00; H02J 50/10; H02J 50/12; H02J 50/60; H02J 50/80; H02J 50/40; H02J 50/90; H02J 5/00; H02J 5/02; H02J 5/025; H02J 7/00; H02J 7/02; H02J 7/025; H04B 5/0031; H04B 5/0037
 USPC .................. 307/104, 149, 66, 64, 38, 82, 39
 See application file for complete search history.

(56) References Cited

U.S. PATENT DOCUMENTS

| | | | | |
|---|---|---|---|---|
| 5,801,644 | A * | 9/1998 | Ruthroff | G08C 17/04 340/870.16 |
| 2011/0088204 | A1* | 4/2011 | Kim | A47L 5/24 15/347 |
| 2013/0015699 | A1* | 1/2013 | Mita | B60L 53/122 307/9.1 |
| 2013/0139620 | A1* | 6/2013 | Hikida | B60S 1/3402 74/47 |
| 2016/0013664 | A1* | 1/2016 | Maekawa | H01F 38/14 307/104 |
| 2017/0043672 | A1* | 2/2017 | Araki | B60L 53/302 |
| 2017/0338685 | A1* | 11/2017 | Jung | H02J 7/0021 |
| 2019/0305826 | A1* | 10/2019 | Park | H02J 50/10 |

FOREIGN PATENT DOCUMENTS

JP 2015-6056 A 1/2015

* cited by examiner

*Primary Examiner* — Nguyen Tran
*Assistant Examiner* — Jagdeep S Dhillon (57) ABSTRACT

A power transfer device comprises a power transfer coil, a case that has a surface extending along a direction perpendicular to an axial direction of the power transfer coil and stores the power transfer coil, a rotating shaft rotatable about the shaft that extends in the axial direction of the power transfer coil at a central portion in a radial direction of the power transfer coil and has one end penetrating the surface and protruding outward through the surface and a foreign object remover that projects outwardly from the one end of the rotating shaft in a radial direction of the rotating shaft and moves on the surface.

7 Claims, 9 Drawing Sheets

POWER TRANSFER DEVICE

CROSS-REFERENCE TO RELATED APPLICATIONS

This Non-provisional application claims priority under 35 U.S.C. § 119(a) on Patent Application No. 2018-138867 filed in Japan on Jul. 24, 2018, the entire contents of which are hereby incorporated by reference.

FIELD

The present techniques relates to a power transfer device for transferring power.

BACKGROUND AND SUMMARY

A contactless power supply device having a rectangular power supply surface has conventionally been proposed. The power supply surface is provided with two wiper parts. Two driving shafts are diagonally provided at two corners of the power supply surface. The wiper parts are coupled to the driving shafts so as to rotate about the driving shafts. The rotation of the wiper parts removes a foreign object adhering to the power supply surface.

The contactless power supply device needs multiple wiper parts and thus tends to become large in size. To prevent interference between the wiper parts, the wiper parts need to be rotated in order, which tends to complicate wiper control.

The present disclosure is made in view of such circumstances, and it is an object of the present disclosure to provide a power transfer device capable of achieving downsizing thereof and simplifying the control for removing a foreign object.

A power transfer device according to the present disclosure comprises a power transfer coil; a case that has a surface extending along a direction perpendicular to an axial direction of the power transfer coil and stores the power transfer coil; a rotating shaft rotatable about the shaft that extends in the axial direction of the power transfer coil at a central portion in a radial direction of the power transfer coil and has one end penetrating the surface and protruding outward through the surface; and a foreign object remover that projects outwardly from the one end of the rotating shaft in a radial direction of the rotating shaft and moves on the surface.

According to the present disclosure, by rotation of the rotating shaft, the foreign object remover is rotated on the surface of the case, which removes the foreign object adhering to the surface and prevents entry of a living body such as a person, a dog, a cat or the like into the power transfer surface.

In the power transfer device according to the present disclosure, in the radial direction of the rotating shaft, a length of the foreign object remover is greater than a radius of the power transfer coil.

According to the present disclosure, a region from which the foreign object remover removes a foreign object is larger than at least the area of the power transfer coil. The area of the power transfer coil corresponds to a region where a line of magnetic force passes through, so that the foreign object remover can remove a foreign object at the region where the line of magnetic force passes through. Furthermore, the foreign object remover prevents entry of a living body into the area above the power transfer coil.

In the power transfer device according to the present disclosure, in the radial direction of the rotating shaft, the length of the foreign object remover is greater than a length between a center of the rotating shaft and an edge of the surface.

According to the present disclosure, the region from which a foreign object can be removed by the foreign object remover is larger than the surface. This makes it possible to remove the foreign object from the entire surface.

In the power transfer device according to the present disclosure, a motor providing the rotating shaft with power is disposed away from the surface and close to the other end of the rotating shaft.

According to the present disclosure, the motor can be less affected by a magnetic field. If the power transfer surface faces aboveground, the motor faces underground, which allows the motor to be less affected by environment, for example, weather.

In the power transfer device according to the present disclosure, a plurality of the foreign object removers are provided.

According to the present disclosure, use of the multiple foreign object removers can enhance the effect of removing a foreign object. Moreover, even if any one of the foreign object removers is damaged, the other foreign object removers can remove a foreign object.

In the power transfer device according to the present disclosure, the foreign object remover includes a resin material or wire.

According to the present disclosure, use of a relatively soft material can prevent the foreign object remover from damaging a living body if the foreign object remover contacts the living body. The use of a relatively soft material can also enhance impact resistance. For example, even if a person steps on the foreign object remover by mistake, damage to the foreign object remover can be prevented.

The power transfer device according to the present disclosure further comprises a foreign object detector that detects a foreign object on the surface.

According to the present disclosure, if a foreign object is detected by the foreign object detector, for example, the foreign object remover can be rotated.

In the power transfer device according to the present disclosure, the surface is slanted so as to descend toward an edge of the surface.

According to the present disclosure, if a foreign object is put on the slanted part, the configuration helps move the foreign object downward to thereby clear the foreign object from the surface.

In the power transfer device according to the present disclosure, by rotation of the rotating shaft, the foreign object remover is rotated on the surface of the case, which removes the foreign object adhering to the surface. Since the rotating shaft is arranged at the central portion in the radial direction of the power transfer coil, mere driving of a single foreign object remover enables removal of a foreign object from the surface. This makes it possible to downsize the power transfer device and simplify the control of the foreign object removal part.

The above and further objects and features will more fully be apparent from the following detailed description with accompanying drawings.

DETAILED DESCRIPTION OF NON-LIMITING EXAMPLE EMBODIMENTS

Embodiment 1

Figure 1:
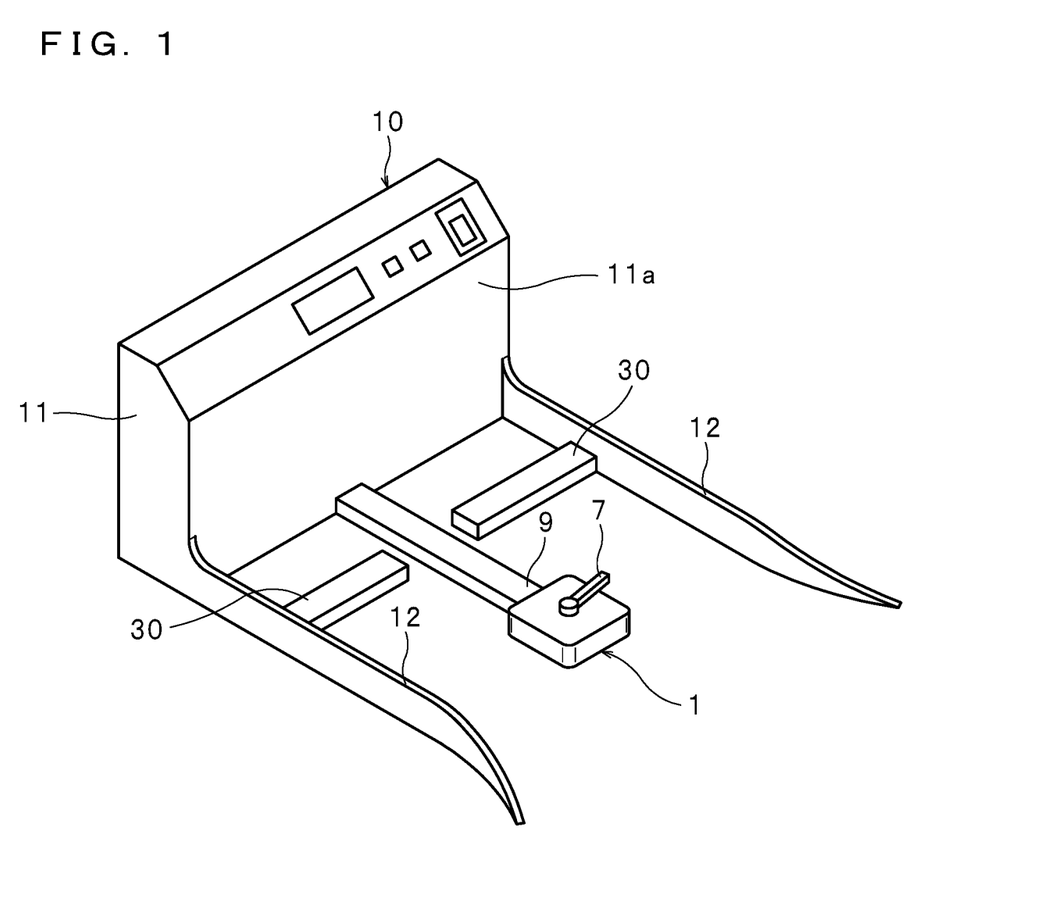
FIG. 1 is a schematic perspective view illustrating a power transfer device according to Embodiment 1.
Figure 2:
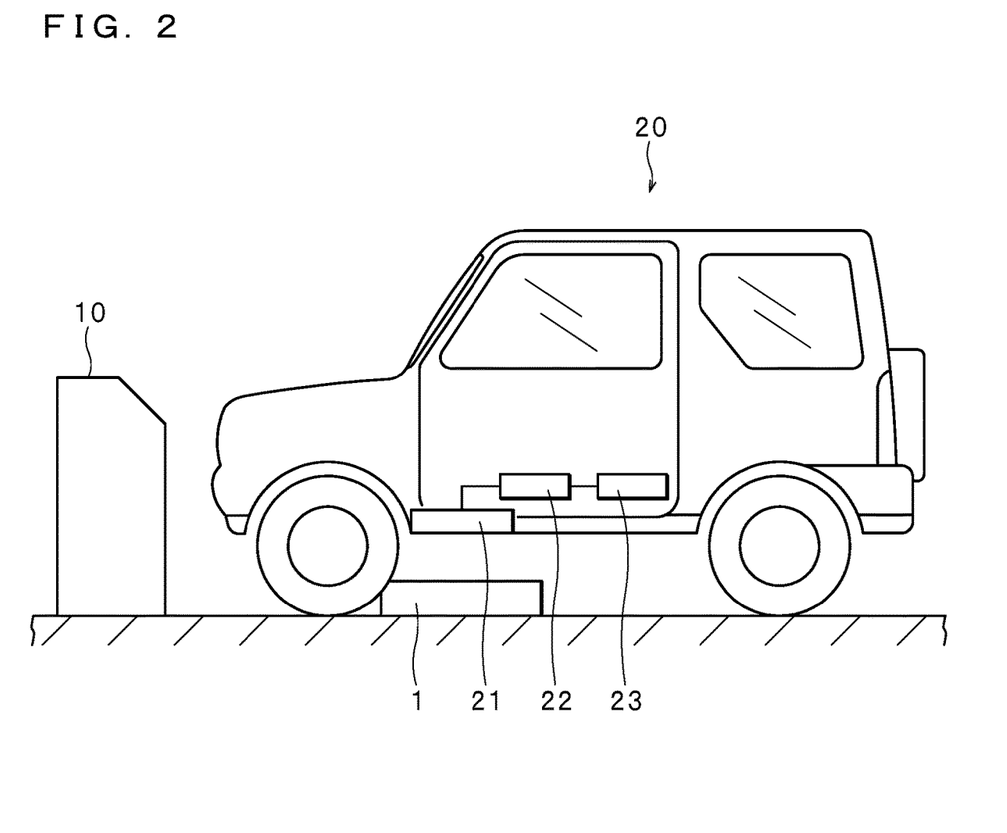
FIG. 2 is a schematic view illustrating the power transfer device and a vehicle.

The present invention will be described below with reference to the drawings illustrating a power transfer device according to Embodiment 1. FIG. 1 is a schematic perspective view illustrating a power transfer device, and FIG. 2 is a schematic view illustrating the power transfer device and a vehicle 20.

The power transfer device includes a power transfer unit 1 and a power transfer control unit 10. The power transfer control unit 10 is installed on the ground. The power transfer control unit 10 has, for example, a rectangular parallelepiped housing 11. The housing 11 stores, for example, a high-frequency power supply device and a control substrate. The control board is implemented with, for example, a processor such as a central processing unit (CPU), a micro processing unit (MPU) or the like, and a random access memory (RAM), a nonvolatile memory or the like. Note that, in place of the processor, a logical circuit, for example, a field programmable gate array (FPGA) may be used. Two guide parts 12 for guiding the vehicle 20 protrude in the same direction from one side surface 11a of the housing 11. The two guide parts 12 take the shape of a long, narrow board and extend along the ground. The two guide parts 12 are disposed substantially perpendicular to the ground surface and are opposed to each other with a space between them. The protruding ends of the two guide parts 12 are outwardly curved so as to gradually increase the distance between them.

The power transfer control unit 10 is connected to the power transfer unit 1 through a wiring 9. The power transfer unit 1 is installed on the ground and disposed between the two guide parts 12. The power transfer unit 1 has a power transfer coil 3 (see FIGS. 3 and 4), which will be described later. The power transfer control unit 10 supplies power to the power transfer coil 3, which causes current to flow in the power transfer coil 3.

Between the power transfer unit 1 and the power transfer control unit 10 and between the two guide parts 12, two vehicle stoppers 30, for example, are disposed. The distance between the opposite two guide parts 12 corresponds to the lateral width of the vehicle 20. For example, if the vehicle 20 is located between the two guide parts 12 and is advanced toward the power transfer control unit 10, the guide parts 12 guide the vehicle 20. The driver of the vehicle 20 can stop the vehicle 20 with the two front wheels in contact with the respective two vehicle stoppers 30.

The vehicle 20 is equipped with a power reception coil 21, a power reception unit 22 and a battery 23. The power reception coil 21 is connected to the battery 23 via the power reception unit 22. The power reception coil 21 is arranged on the bottom surface of the vehicle 20. If the vehicle 20 is stopped at a predetermined position, for example, if the vehicle 20 is stopped while being in contact with the vehicle stoppers 30, the power reception coil 21 is so installed in the vehicle 20 as to be opposed to the power transfer unit 1. The power reception unit 22 has a rectifier circuit, a resonant capacitor and so on. The power reception coil 21 is magnetically coupled to the power transfer coil 3, so that power is contactlessly supplied from the power transfer coil 3 to the power reception coil 21 to thereby charge the battery 23.

Figure 3:
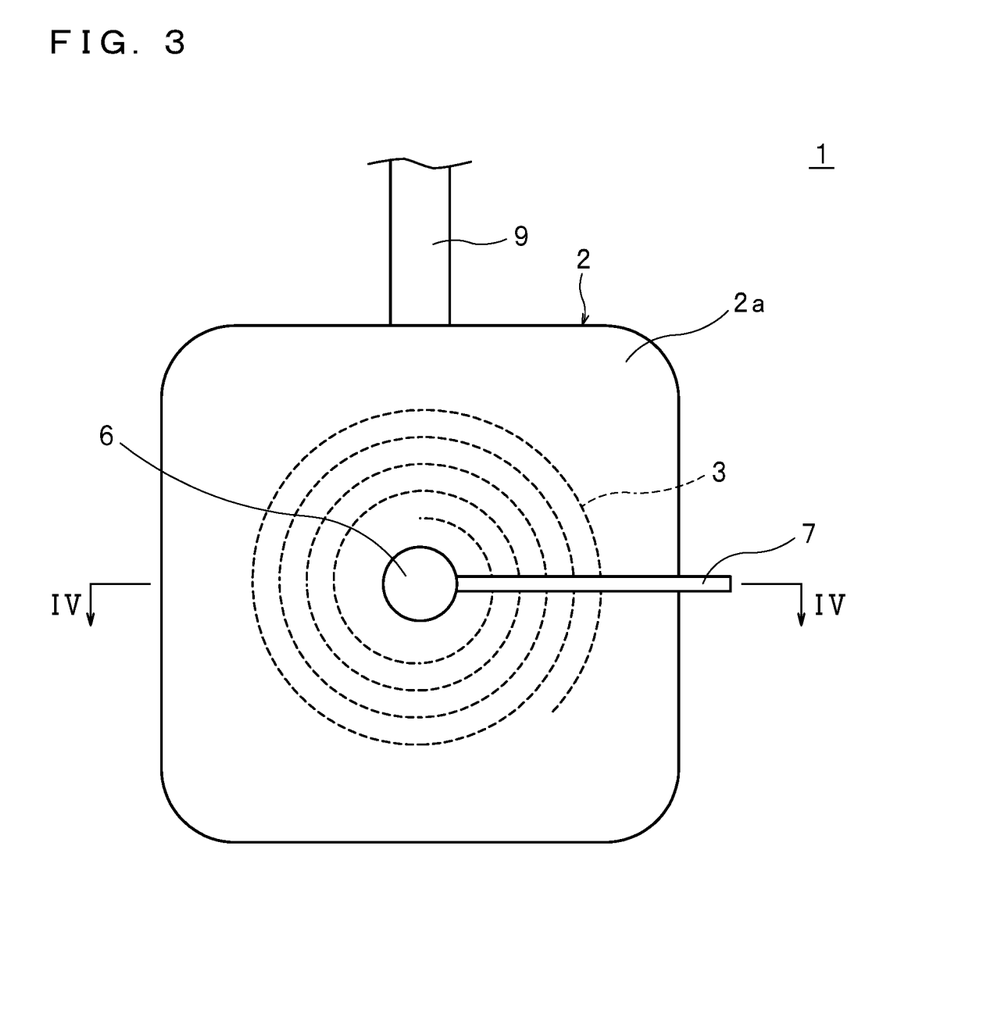
FIG. 3 is a plan view schematically illustrating a power transfer unit.
Figure 4:
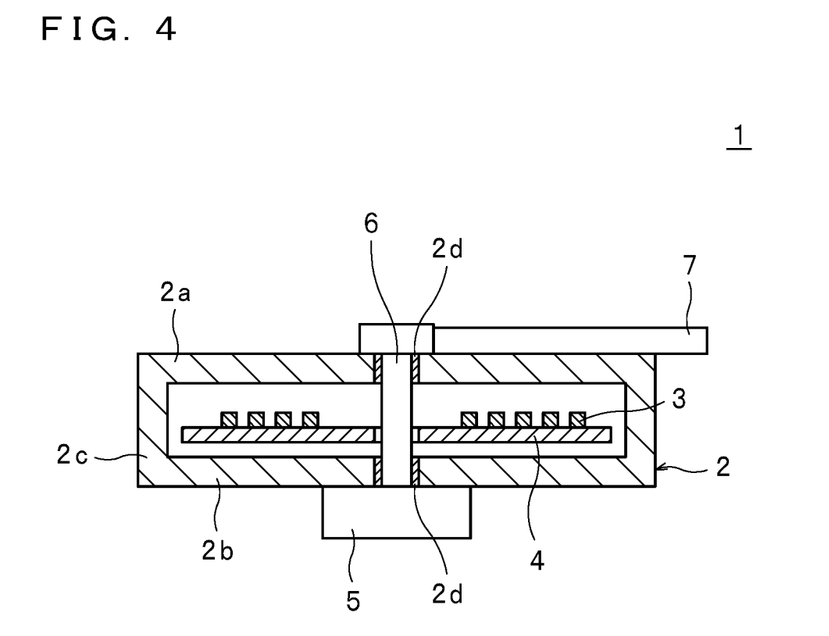
FIG. 4 is a cross-sectional view taken along line IV-IV in FIG. 3.

FIG. 3 is a plan view schematically illustrating the power transfer unit 1, and FIG. 4 is a cross-sectional view taken along line IV-IV in FIG. 3. The power transfer unit 1 has a flat rectangular parallelepiped case 2. The case 2 has a rectangular first surface part 2a and a rectangular second surface part 2b that are opposed to each other, and a peripheral surface part 2c that is disposed along the entire perimeter of the first surface part 2a and the second surface part 2b and that connects the first surface part 2a and the second surface part 2b to each other. The first surface part 2a is located above the second surface part 2b. The power transfer unit 1 is installed on the ground with the first surface part 2a exposed.

The case 2 stores a sheet-type shield 4 that is substantially parallel with the first surface part 2a and the second surface part 2b, and the power transfer coil 3 being spiral in plan view that is arranged on one surface of the shield 4. The shield 4 is made of a magnetic substance, for example, a ferrite material. The shield 4 protects a motor 5 to be described later from the magnetic field. The power transfer coil 3 is opposite to the first surface part 2a while the shield 4 is opposite to the second surface part 2b.

The motor 5 is provided on the outer surface of the second surface part 2b. The motor 5 is connected to a rotating shaft 6 that rotates about the shaft. No coil is present around the center in the radial direction of the power transfer coil 3, which produces a space encircled by the coil. The rotating shaft 6 is located around the center in the radial direction of the power transfer coil 3, i.e., the space encircled by the coil. The rotating shaft 6 extends in the axial direction of the power transfer coil 3 and penetrates the first surface part 2a and the second surface part 2b. Note that a seal member 2d is provided in the gap between the rotating shaft 6 and the first surface part 2a and the gap between the rotating shaft 6 and the second surface part 2b, which prevents liquid from entering the case 2.

One end of the rotating shaft 6 penetrates the first surface part 2a and protrudes outward through the first surface part 2a. From the one end of the rotating shaft 6, a blade 7 projects. The blade 7 extends in the radial direction of the power transfer coil 3 along the outer surface of the first surface part 2a. In the radial direction, the tip end of the blade 7 is positioned beyond the case 2. That is, the length of the blade 7 is greater than the radius of the power transfer coil 3 and is greater than the length between the center of the rotating shaft 6 and the edge of the first surface part 2a. The blade 7 is in contact with the outer surface of the first surface part 2a. The blade 7 is made of material with high flexibility and high impact resistance such as resin material or wire, for example. The other end of the rotating shaft 6 penetrates the second surface part 2b so as to be connected to the motor 5. Note that the motor 5 may be provided inside the case 2 to thereby transmit the rotation of the motor 5 to the rotating shaft 6 via a transmission member, for example, a bevel gear. Alternatively, the motor 5 may be provided outside the case 2 to thereby couple the motor 5 and the rotating shaft 6 via a transmission member such as a belt and a pulley.

The power transfer control unit 10 drives the motor 5, for example, before or during the execution of power transfer by the power transfer coil 3. The motor 5 is driven to thereby rotate the rotating shaft 6, so that the blade 7 rotates while being in contact with the outer surface of the first surface part 2a. If a foreign object such as a clip, a leaf, an insect, etc. adheres to the outer surface of the first surface part 2a, the blade 7 removes the foreign object. Alternatively, if a living body, for example, a cat is on the first surface part 2a, the living body can be moved from the power transfer unit 1 by rotation of the blade 7. During rotation of the blade 7, entry of a living body such as a person, a dog, a cat or the like into the first surface part 2a can be prevented.

In the power transfer device according to the embodiment, the blade 7 rotates on the first surface part 2a of the case 2 to thereby remove the foreign object adhering to the first surface part 2a. The removal of the foreign object enhances power transfer efficiency. If any foreign metallic material such as a clip, a coin or a nail, for example, is present on the first surface part 2a, the foreign object generates heat upon power transfer. The removal of the foreign object, however, can prevent the foreign object from generating heat, which can increase security. During rotation of the blade 7, entry of a living body such as a person, a dog, a cat or the like into the power transfer surface can be prevented.

The region from which the blade 7 removes a foreign object is larger than at least the area of the power transfer coil 3 in plan view. The area of the power transfer coil 3 corresponds to the region where a line of magnetic force passes through, so that the blade 7 can remove a foreign object at the region where the line of magnetic force passes through. Furthermore, the blade 7 prevents entry of a living body into the area above the power transfer coil.

The length of the blade 7 is greater than the length between the center of the rotating shaft 6 and the edge of the first surface part 2a while the region from which the blade 7 can remove a foreign object is larger than the area of the first surface part 2a. This makes it possible to remove the foreign object from the entire first surface part 2a.

Furthermore, the first surface part 2a faces aboveground while the second surface part 2b faces underground. The motor 5 is disposed on the outer surface of the second surface part 2b. The motor 5 is not exposed to the outdoors, so that the motor can be less affected by the environment, for example, weather. Moreover, the motor 5 is disposed opposite to the power transfer coil 3, so that the motor 5 can be less affected by a magnetic field caused by the power transfer coil 3.

Use of a relatively soft material such as a resin material, wire or the like for the blade 7 can prevent the blade 7 from damaging a living body, for example, a cat if the blade 7 contacts the living body. The use of a relatively soft material also enhances impact resistance. For example, even if a person steps on the blade 7 by mistake, damage to the blade 7 can be prevented.

Additionally, a foreign object is removed from the first surface part 2a before or during the execution of power transfer, which achieves efficient power transfer.

Embodiment 2

Figure 5:
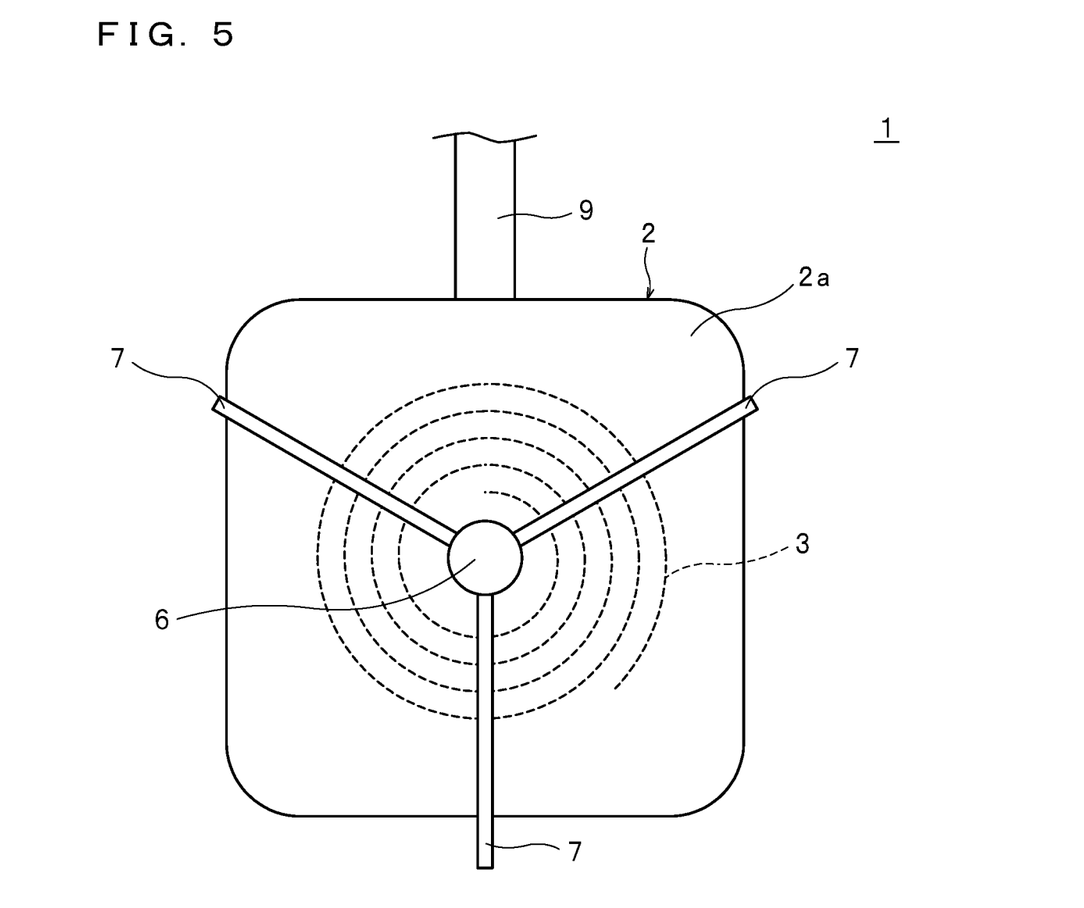
FIG. 5 is a plan view schematically illustrating a power transfer unit according to Embodiment 2.

The present invention will be described below with reference to the drawings illustrating a power transfer device according to Embodiment 2. FIG. 5 is a plan view schematically illustrating a power transfer unit 1. One blade 7 projects from the rotating shaft 6 in Embodiment 1 while three blades 7 project from a rotating shaft 6 in Embodiment 2. The three blades 7 are spaced substantially equally in the circumferential direction of the rotating shaft 6.

According to Embodiment 2, use of the multiple blades 7 can enhance the effect of removing a foreign object. Moreover, even if any one of the blades 7 is damaged, the other blades 7 can remove a foreign object. It is noted that two, or four or more blades 7 may be used.

Some of the components in Embodiment 2 similar to those in Embodiment 1 are denoted by the same reference codes and detailed description thereof will not be repeated.

Embodiment 3

Figure 6:
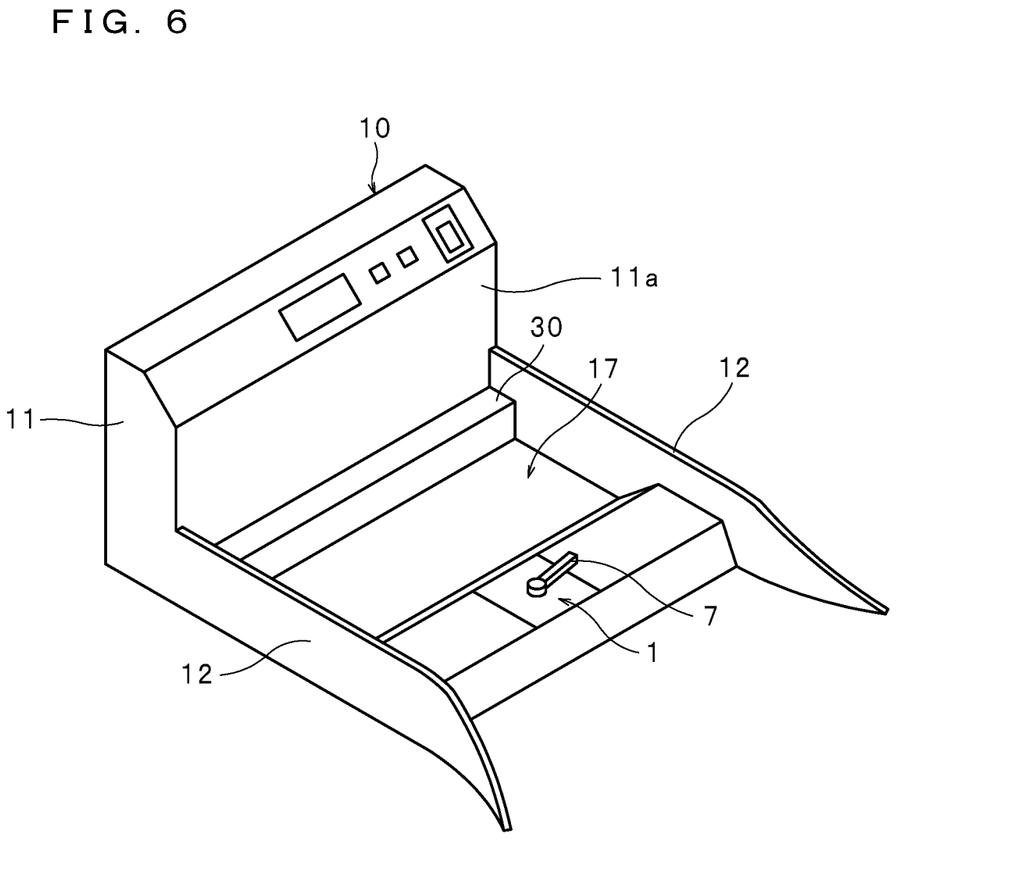
FIG. 6 is a schematic view illustrating a power transfer unit, a power transfer control unit, guide parts, a vehicle stopper, etc. according to Embodiment 3.

The present invention will be described below with reference to the drawings illustrating a power transfer device according to Embodiment 3. FIG. 6 is a schematic view illustrating a power transfer unit 1, a power transfer control unit 10, guide parts 12, a vehicle stopper 30, etc. In Embodiment 3, the power transfer unit 1, the power transfer control unit 10, the guide parts 12 and the vehicle stopper 30 are provided as a unit. In Embodiment 3, one transversely elongated vehicle stopper 30 is integrally provided with one side surface 11a of a housing 11. Between the vehicle stopper 30 and the power transfer unit 1, a recess 17 into which the wheels of the vehicle 20 are to be fit is formed. Some of components in Embodiment 3 similar to those in Embodiment 1 or 2 are denoted by the same reference codes and detailed description thereof will not be repeated.

Embodiment 4

Figure 7:
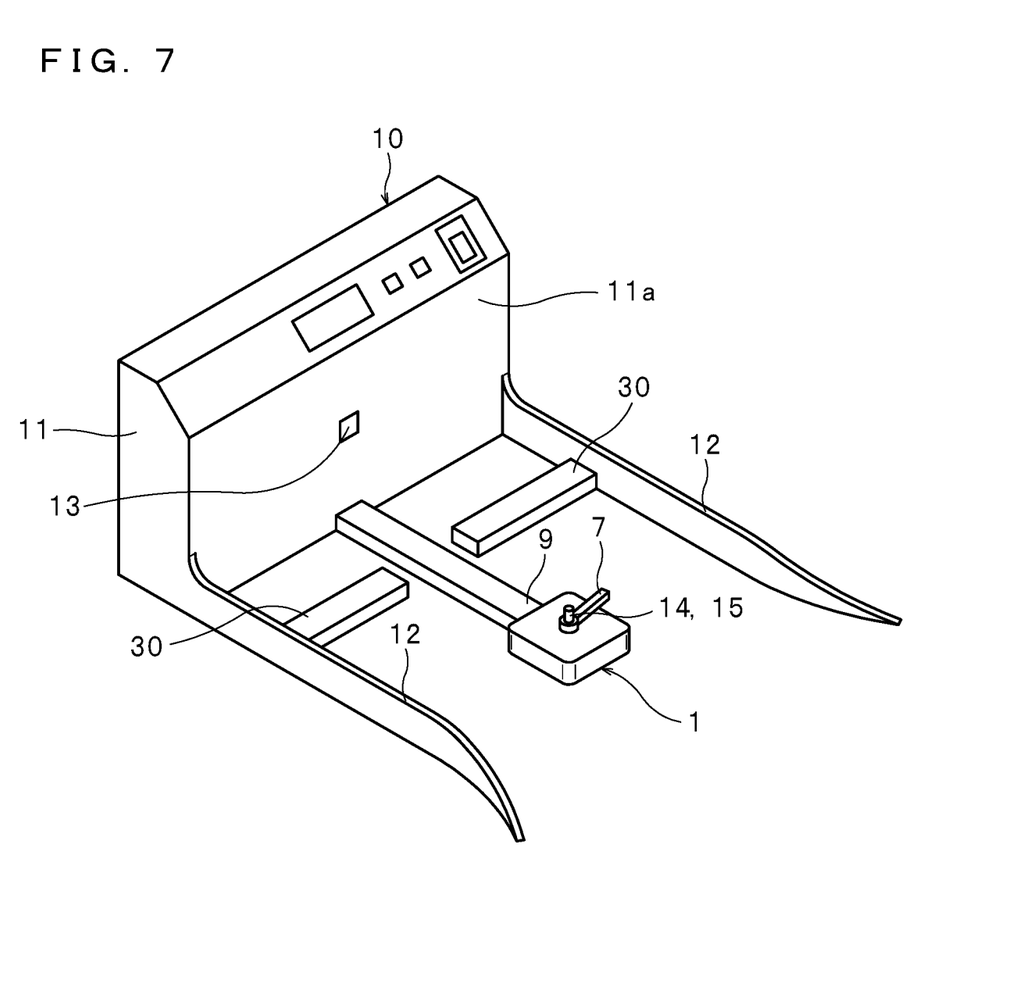
FIG. 7 is a schematic perspective view illustrating a power transfer unit, a power transfer control unit, etc. according to Embodiment 4.
Figure 8:
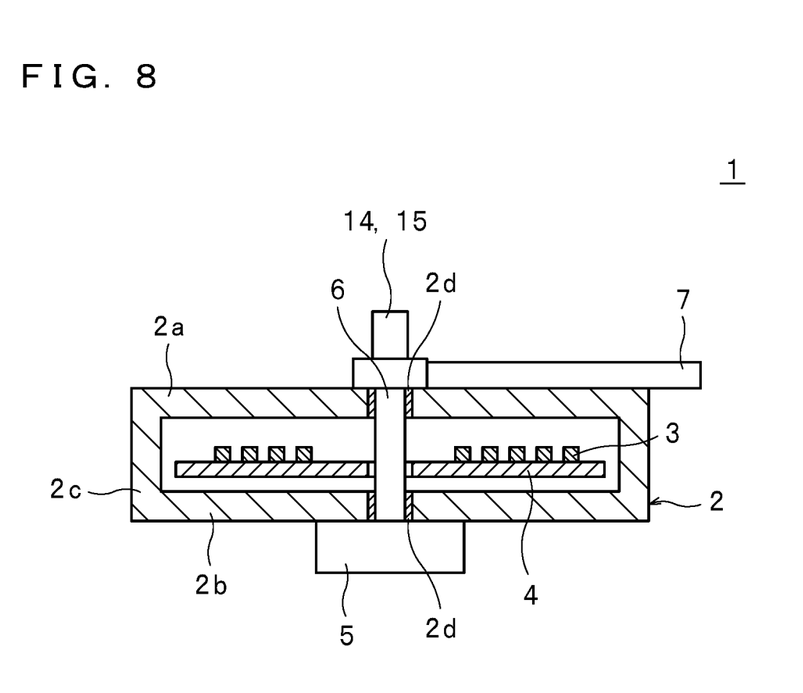
FIG. 8 is a cross-sectional view of the power transfer unit.

The present invention will be described below with reference to the drawings illustrating a power transfer device according to Embodiment 4. FIG. 7 is a schematic perspective view illustrating a power transfer unit 1, a power transfer control unit 10, etc. while FIG. 8 is a cross-sectional view of the power transfer unit 1. At the central portion of one side surface 11a of a housing 11, a proximity sensor 13 is provided. The proximity sensor 13 detects the distance between a vehicle 20 and the power transfer unit 1, for example. Note that the proximity sensor 13 may be provided in the power transfer unit 1.

A camera 14 is coaxially provided at one end of a rotating shaft 6 that protrudes outward. The camera 14 can photograph a range covering 360 degrees around the rotating shaft 6 and includes, for example, an omnidirectional camera or a half celestial sphere camera. The camera 14 photographs the entire outward surface of a first surface part 2a. In view of photographing during the night, an infrared camera or a camera with lighting may be used for the camera 14.

Note that the camera 14 may be provided on the one side surface 11a of the camera 11. In this case, the camera 14 is arranged at a position closer to the ground surface of the one side surface 11a, and whereby even if the vehicle 20 is located above the power transfer unit 1, the camera 14 can photograph the entire outer surface of the first surface part 2a from the space between the bottom surface of the vehicle 20 and the power transfer unit 1.

In place of the camera 14 or together with the camera 14, a thermal sensor 15 may be provided. The thermal sensor 15 is provided at the one end of the rotating shaft 6, for example, and located above the first surface part 2a. The thermal sensor 15 includes an infrared sensor, for example. The region to be detected by the thermal sensor 15 is the entire first surface part 2a.

Note that the thermal sensor 15 may be provided on the one side surface 11a of the housing 11. The thermal sensor 15 is arranged at a position closer to the ground surface of the one side surface 11a, and whereby even if the vehicle 20 is located above the power transfer unit 1, the thermal sensor 15 is arranged between the bottom surface of the vehicle 20 and the power transfer unit 1, so that the thermal sensor 15 can set the entire outer surface of the first surface part 2a as a region to be detected. Output signals from the proximity sensor 13, the camera 14 and the thermal sensor 15 are input to the power transfer control unit 10. The power transfer control unit 10 determines the presence or absence of the vehicle 20 and a foreign object as well as the presence or absence of damage to the blade 7 based on the input signals.

In the power transfer device according to Embodiment 4, if the power transfer control unit 10 determines that the vehicle 20 is present above the power transfer unit 1, that is, if the proximity sensor 13 determines that the distance between the vehicle 20 and the power transfer unit 1 is equal to or less than a predetermined distance, the blade 7 can be rotated by driving the motor 5. Note that in place of the proximity sensor 13, a switch, for example, may be provided in the power transfer control unit 10. If the user turns the switch on, it may be determined that the vehicle 20 is present. Alternatively, by processing an image photographed by the camera 14, the presence or absence of the vehicle 20 may be determined.

Alternatively, by processing an image photographed by the camera 14, whether or not a foreign object is present on the first surface part 2a may be determined. For example, if it is determined that a foreign object is present after rotation of the blade 7 for a predetermined time period, the blade 7 is rotated again to thereby surely remove the foreign object. Alternatively, by processing an image photographed by the camera 14, the presence or absence of damage to the blade 7 may be determined. If determining that the blade 7 is damaged, the power transfer control unit 10 may notify an administrative server of abnormality through a network, for example.

Alternatively, by providing the thermal sensor 15, whether or not heat is generated on the first surface part 2a upon power transfer may be determined. If heat is generated upon power transfer, a metallic foreign object may present on the first surface part 2a. Accordingly, if it is determined that heat is generated upon power transfer, the blade 7 is rotated to thereby surely remove the foreign object, which can improve security. Note that a sensor for detecting the torque or the rotation speed of the motor 5 may be provided. If the torque is increased, or if the rotation speed is lowered, for example, the power transfer control unit 10 may determine that a foreign object is present.

Some of the components in Embodiment 4 similar to those in Embodiments 1-3 are denoted by the same reference codes and detailed description thereof will not be repeated.

Embodiment 5

Figure 9:
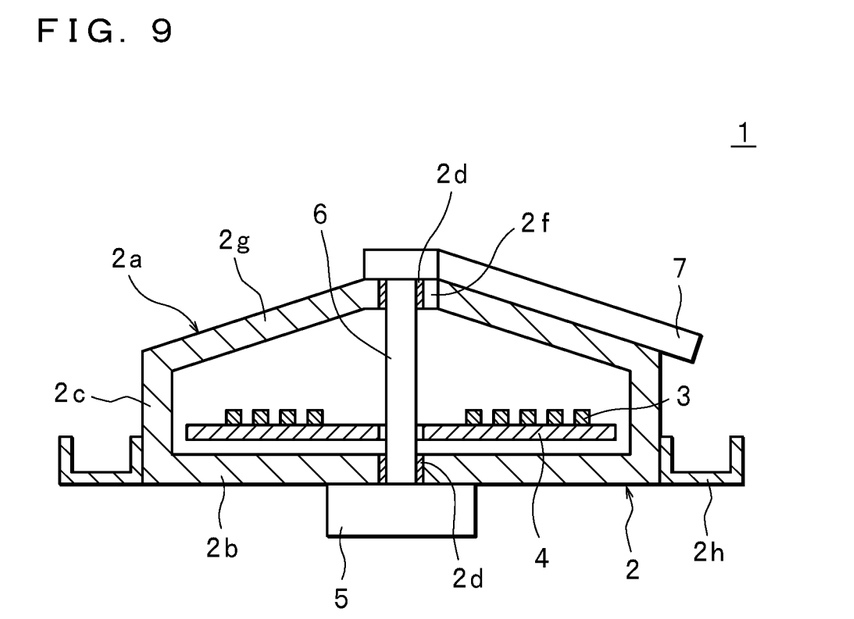
FIG. 9 is a cross-sectional view of a power transfer unit according to Embodiment 5.

FIG. 9 is a cross-sectional view of a power transfer unit 1 according to Embodiment 5. A first surface part 2a of a case 2 has a truncated conical shape the bottom surface of which is open. The first surface part 2a includes a top part 2f that is substantially parallel with the second surface part 2b and is formed in a circle in plan view smaller in diameter than the second surface part 2b and a slanted part 2g that projects from the entire perimeter of the top part 2f like an umbrella and is slanted downward. The slanted part 2g is slanted so as to descend from the top part 2f to the edge of the first surface part 2a. The first surface part 2a has the opening that faces the second surface part 2b. The first surface part 2a and the second surface part 2b are axially spaced apart. The top part 2f is coaxially arranged with the second surface part 2b. The diameter of the first surface part 2a and the diameter of the second surface part 2b are substantially the same. The perimeter of the first surface part 2a and the perimeter of the second surface part 2b are connected by a peripheral surface part 2c. A gutter-like foreign object receptacle 2h being circularly arcuate is detachably attached to the perimeter of the peripheral surface part 2c. Note that in place of the foreign object receptacle 2h, a groove to receive a foreign object may be formed or a groove-like component may be embedded, in the ground around the peripheral surface part 2c.

One end of a rotating shaft 6 penetrates the top part 2f of the first surface part 2a and protrudes outward from the top surface 2f. From the one end of the rotating shaft 6, a blade 7 projects. The blade 7 extends in the radial direction of the power transfer coil 3 along the outer surface of the slanted part 2g, i.e., along the slanted surface. The tip end of the blade 7 is positioned beyond the case 2 in the radial direction. That is, the length of the blade 7 is greater than the radius of the first surface part 2a. Note that the length of the blade 7 may be substantially the same as the radius of the first surface part 2a or may be slightly shorter than the radius thereof. The blade 7 is in contact with the outer surface of the first surface part 2a.

The power transfer control unit 10 drives the motor 5, for example, before or during the execution of power transfer by the power transfer coil 3. By driving the motor 5, the rotating shaft 6 is rotated, whereby the blade 7 rotates about the axis of the power transfer coil 3 while being in contact with the slanted part 2g of the first surface part 2a. If a foreign object such as a clip, a leaf, an insect, etc. adheres to the outer surface of the slanted part 2g, the blade 7 removes the foreign object. The foreign objects removed by the blade 7 are stored in the foreign object receptacle 2h. Detachment of the foreign object receptacle 2h from the peripheral surface part 2c enables an easy removal of the foreign objects from the foreign object receptacle 2h. If a living body, for example, a cat is on the first surface part 2a, the living body can be moved from the power transfer unit 1 by rotation of the blade 7.

If a foreign object is put on the slanted part 2g of the first surface part 2a, the configuration helps move the foreign object downward to thereby clear the foreign object from the first surface part 2a. Some of the components in Embodiment 5 similar to those in Embodiments 1-4 are denoted by the same reference codes and detailed description thereof will not be repeated.

It is to be noted that, as used herein and in the appended claims, the singular forms "a", "an", and "the" include plural referents unless the context clearly dictates otherwise.

It is to be understood that the embodiments disclosed here is illustrative in all respects and not restrictive. It is to be understood that the embodiments disclosed here is illustrative in all respects and not restrictive. The features of the respective embodiments can be combined with each other. The scope of the present invention is defined by the appended claims, and all changes that fall within the meanings and the bounds of the claims, or equivalence of such meanings and bounds are intended to be embraced by the claims.

What is claimed is:

1. A power transfer device disposed outside of a vehicle and configured to transfer power to the vehicle, the power transfer device comprising:
a power transfer coil;
a case that has a surface extending along a direction perpendicular to an axial direction of the power transfer coil and stores the power transfer coil;
a rotating shaft rotatable about the shaft that extends in the axial direction of the power transfer coil at a central portion in a radial direction of the power transfer coil and that has one end penetrating the surface and protruding outward through the surface;
a foreign object remover that projects outwardly from the one end of the rotating shaft in a radial direction of the rotating shaft and moves on the surface;
a motor to rotate the rotating shaft;
a shield made of a magnetic substance which is located between the power transfer coil and the motor;
a camera which photographs the surface;
a foreign object detector that detects a foreign object on the surface by processing an image photographed by the camera; and
a damage detector that detects damage of the foreign object remover by processing an image photographed by the camera,
wherein the rotating shaft is provided for the purpose of moving the foreign object remover.

2. The power transfer device according to claim 1, wherein in the radial direction of the rotating shaft, a length of the foreign object remover is greater than a radius of the power transfer coil.

3. The power transfer device according to claim 2, wherein in the radial direction of the rotating shaft, the length of the foreign object remover is greater than a length between a center of the rotating shaft and an edge of the surface.

4. The power transfer device according to claim 1, wherein the motor is disposed away from the surface and close to the other end of the rotating shaft.

5. The power transfer device according to claim 1, wherein a plurality of the foreign object removers are provided.

6. The power transfer device according to claim 1, wherein the foreign object remover includes a resin material or wire.

7. The power transfer device according to claim 1, wherein the surface is slanted so as to descend toward an edge of the surface.

* * * * *